United States Patent
Resch et al.

(10) Patent No.: US 7,624,530 B2
(45) Date of Patent: Dec. 1, 2009

(54) FISHING NET

(76) Inventors: Christopher T. Resch, W15153 Willow Rd., Birnamwood, WI (US) 54414; Amy R. Resch, W15153 Willow Rd., Birnamwood, WI (US) 54414

( * ) Notice: Subject to any disclaimer, the term of this patent is extended or adjusted under 35 U.S.C. 154(b) by 65 days.

(21) Appl. No.: 11/874,736

(22) Filed: Oct. 18, 2007

(65) Prior Publication Data

US 2009/0100739 A1    Apr. 23, 2009

(51) Int. Cl.
*A01K 77/00* (2006.01)
*A01K 75/02* (2006.01)

(52) U.S. Cl. ............................................. 43/12; 43/17.5
(58) Field of Classification Search ..................... 43/12, 43/11, 17.5
See application file for complete search history.

(56) References Cited

U.S. PATENT DOCUMENTS

| | | | | |
|---|---|---|---|---|
| 2,066,439 A * | 1/1937 | Wine et al. | | 43/12 |
| 2,420,087 A * | 5/1947 | Meek | | 43/17.5 |
| 2,600,773 A * | 6/1952 | Hungerford | | 43/12 |
| 2,791,676 A * | 5/1957 | Cote | | 362/119 |
| 2,817,175 A * | 12/1957 | Morris | | 43/11 |
| 3,077,693 A * | 2/1963 | Wallin | | 43/11 |
| 4,800,667 A | 1/1989 | Johnson | | |
| 5,913,671 A * | 6/1999 | Fernandez et al. | | 43/18.1 R |
| 6,260,302 B1 * | 7/2001 | Blaschke | | 43/12 |
| 6,655,072 B2 * | 12/2003 | Blaschke | | 43/12 |
| 6,908,216 B2 * | 6/2005 | Love | | 362/253 |
| 7,395,629 B1 * | 7/2008 | Thomas | | 43/17.5 |
| 2006/0005452 A1 * | 1/2006 | McIntyre | | 43/11 |

* cited by examiner

*Primary Examiner*—Kurt Rowan
(74) *Attorney, Agent, or Firm*—Dale J. Ream

(57) ABSTRACT

A fishing net includes a hoop having a net defining a catch area and having an array of illumination elements on the hoop. A bracket connects first and second ends of the hoop and defines a passage therebetween. The fishing net includes a handle coupled to the bracket and movable through the passage between use and storage configurations. A lantern is coupled to a distal end of the handle relative to the hoop, the lantern being movable between retracted, extended, and offset configurations relative to the handle. The fishing net includes a flexible shaft having a light element and that is movable between a retracted configuration in the handle and an extended configuration extending from the handle adjacent the hoop for illuminating a specific area.

14 Claims, 6 Drawing Sheets

FISHING NET

BACKGROUND OF THE INVENTION

This invention relates generally to fishing gear and, more particularly, to a fishing net that is collapsible for storage, includes a variety of light sources for use in dark environments, and performs all of the utility needs of a traditional fishing net.

Having reliable and functional fishing gear and tackle is very important to any fisherman or outdoors enthusiast. A common item used in fishing is a fishing net mounted on the end of a relatively long pole. Such a net is used to scoop a fish out of the water when it has been reeled in close to the shore or boat. Successfully "netting" a fish, however, is still quite difficult when fishing at night due to extreme darkness. Further, fishing net handles are frequently relatively short for use but long enough that storage and transport of the fishing net may be inconvenient or awkward. In addition, removing a hook from the fish's mouth, baiting a hook, or changing other tackle is generally difficult to accomplish in the dark or when trying to hold a flashlight Various devices have been proposed in the art for illuminating fishing net devices such as nets. Although assumably effective for their intended purposes, the existing devices do not provide an array of lights about the hoop along with other auxiliary lighting options and collapsibility features.

Therefore, it would be desirable to have a fishing net having an array of light sources positioned about the periphery of a hoop for illuminating the contents of the net. Further, it would be desirable to have a fishing net having an auxiliary light mounted on a flexible shaft near the end of the devices handle for illuminating a specific area, say, while baiting a hook or emptying the catch area of the fishing net, etc. In addition, it would be desirable to have a fishing net that is collapsible for storage or transport.

SUMMARY OF THE INVENTION

A fishing net according to the present invention includes a hoop having first and second ends. A net is coupled to the hoop for defining a catch area. A bracket that is coupled to the first and second hoop ends defines a passage therebetween. The fishing net includes a handle having first and second ends that is movable through the bracket passage between use and storage configurations. The handle first end is generally adjacent the bracket and the handle second end is relatively distant/displaced from the hoop altogether at the use configuration. By contrast, the handle first end is separated/displaced from the bracket and the handle second end is relatively near the hoop when the handle is positioned at the storage configuration. In other words, the handle may be extended for use and retracted for storage or transport.

The fishing net further includes an array of light elements coupled to the hoop for lighting the catch area within the net. The device also includes a lantern at the second/distal end of the handle that is retractable when not in use and adjustable to selectable offset positions to facilitate illumination of a surrounding area. In addition, a flexible shaft having a light element may be selectively retractable into the handle. When extended, the flexible shaft light element may be used to illuminate an area adjacent the flexible shaft.

Therefore, a general object of this invention is to provide a fishing net for assisting a fisherman in collecting a caught fish.

Another object of this invention is to provide a fishing net, as aforesaid, that is collapsible for convenient storage and transport.

Still another object of this invention is to provide a fishing net, as aforesaid, that includes an array of lights sources for illuminating a catch area of a net attached to a hoop.

Yet another object of this invention is to provide a fishing net, as aforesaid, that selectively illuminates a general area surrounding the fishing net.

A further object of this invention is to provide a fishing net, as aforesaid, that selectively illuminates a specific area, as directed by a user.

A still further object of this invention is to provide a fishing net, as aforesaid, that is cost-effective to manufacture and user-friendly to use.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2 is an exploded view of the fishing net as in FIG. 1a;

DESCRIPTION OF THE PREFERRED EMBODIMENT

Figure 1A:
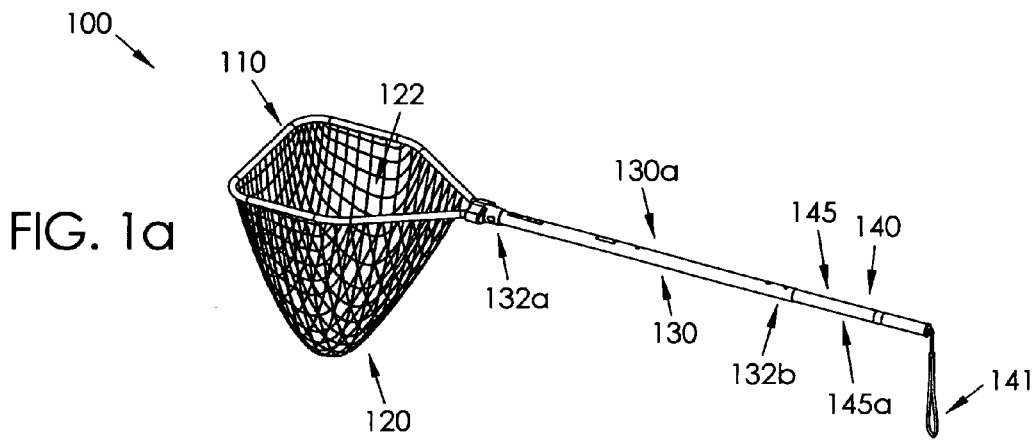
FIG. 1a is a perspective view of a fishing net according to a preferred embodiment of the present invention illustrated with a lantern in an extended configuration.

A fishing net 100 according to the present invention will now be described in detail with reference to FIGS. 1a through 6a of the accompanying drawings. More particularly, according to the current invention, a fishing net 100 includes a hoop 110, a net 120, a handle 130 having first and second ends 132a, 132b, and a lantern 140.

Figure 1B:
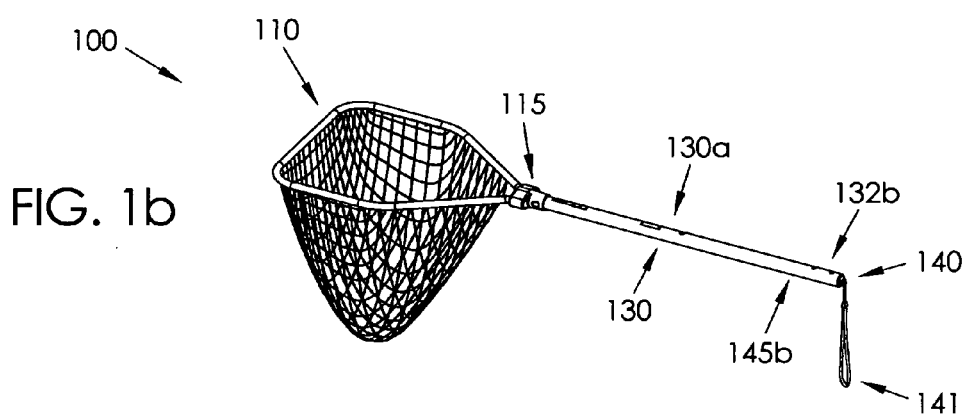
FIG. 1b is another perspective view of the fishing net as in FIG. 1a with the lantern in a retracted configuration.
Figure 1C:
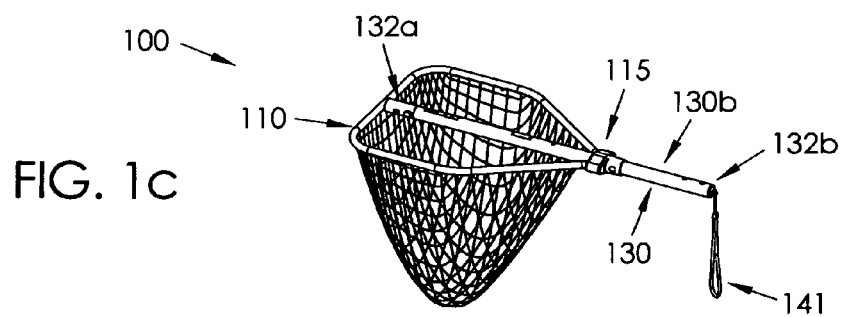
FIG. 1c is still another perspective view of the fishing net as in FIG. 1b with the handle in a storage configuration.
Figure 2:
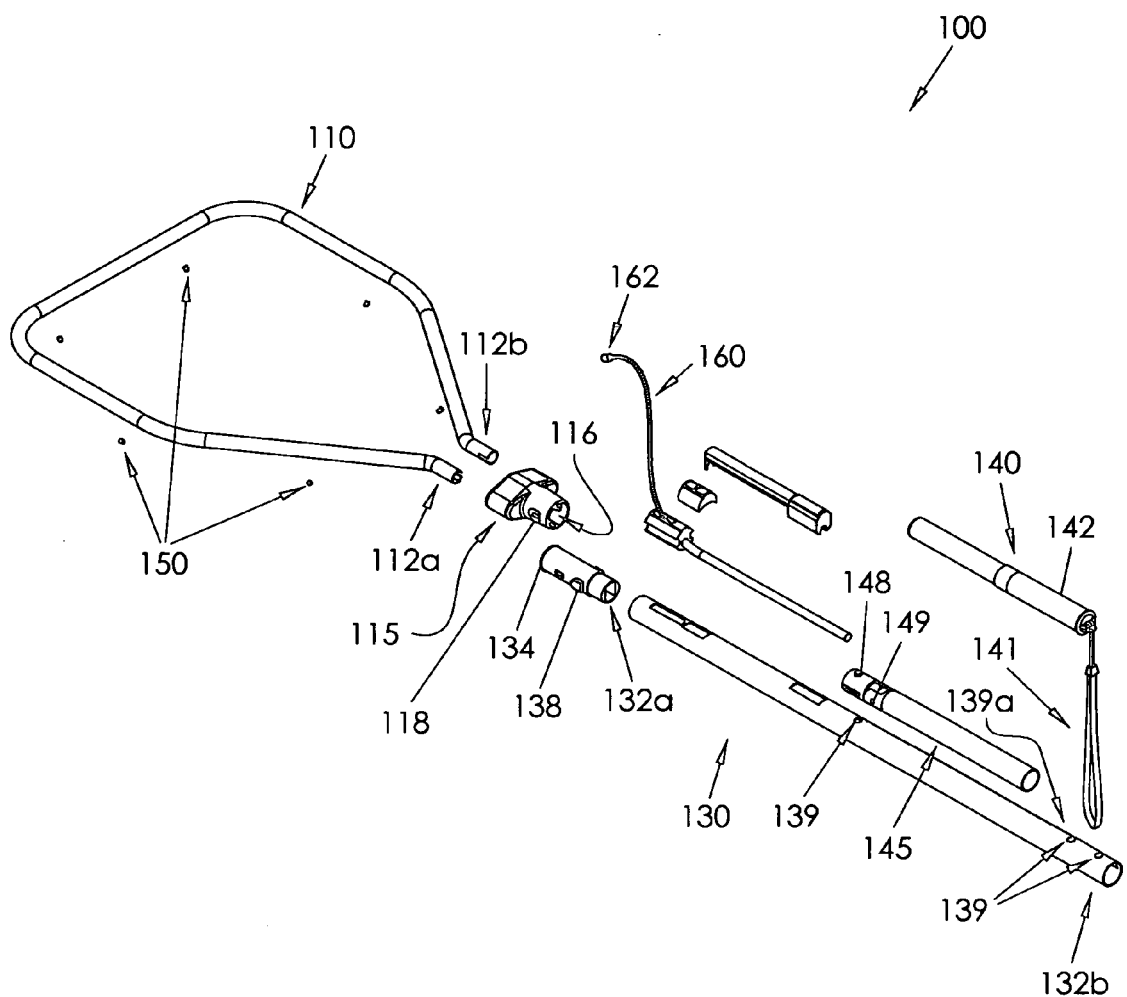

As shown in FIG. 1a, the net 120 is coupled to the hoop 110 to define a catch area 122, and the handle first end 132a may be coupled to the hoop 110 so that the handle second end 132b extends away from the hoop 110. More particularly, as shown in FIG. 2, the hoop 110 may have first and second ends 112a, 112b, and a bracket 115 may be coupled to the hoop first and second ends 112a, 112b. The bracket 115 may define a passage 116 between the hoop first and second ends 112a, 112b, and the handle 130 may be movable through the bracket passage 116 between a use configuration 130a (FIGS. 1a and 1b) and a storage configuration 130b (FIG. 1c). When at the use configuration 130a (FIGS. 1a and 1b), the handle first end 132a is adjacent the bracket 115 and the handle second end 132b is relatively distant from the hoop 110; when at the storage configuration 130b (FIG. 1c), the handle first end 132a is separated from the bracket 115 and the handle second end 132b is relatively near the hoop 110.

Figure 6:
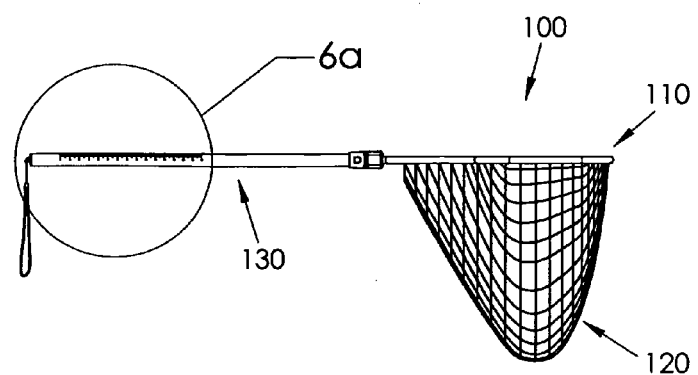
FIG. 6 is a side view of the fishing net as in FIG. 1b.
Figure 6A:
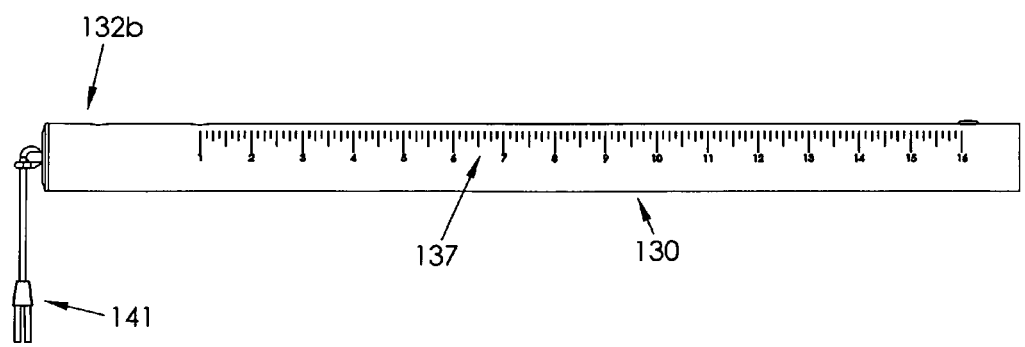
FIG. 6a is an isolated view on an enlarged scale of a portion of the fishing net handle taken from FIG. 6.

The handle first end 132a may have a configuration that maintains the handle 130 coupled to the bracket 115. In other words, the handle first end 132a may include a flare 134 (FIG. 2) that does not allow the handle first end 132a to pass entirely through the bracket 115 in a direction away from the hoop 110. Additionally, or alternately, means may be included for selectively maintaining the handle 130 at the use configuration 130a. For example, the bracket 115 may have an aperture 118, and the handle 130 may include a spring-loaded pin 138 complementary to the aperture 118, as shown in FIG. 2. The pin 138 may be received in the aperture 118 to maintain the handle 130 at the use configuration 130a, and the pin 138 may be released from the aperture 118 to allow the handle 130 to move to the storage configuration 130b. As shown in FIG. 6a, the handle 130 may include measurement indicia 137 for determining a length of an item caught using the net 120.

Figure 4A:
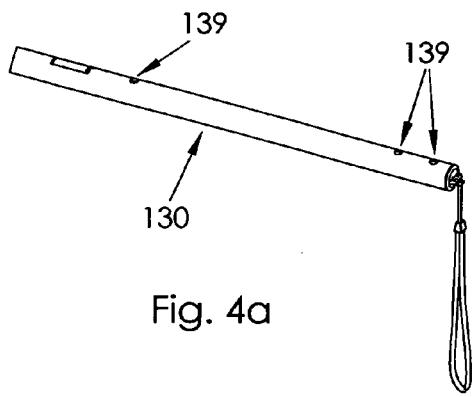
FIG. 4a is a fragmentary view of the second end of the fishing net handle as in FIG. 1b with the lantern in a retracted configuration.
Figure 4B:
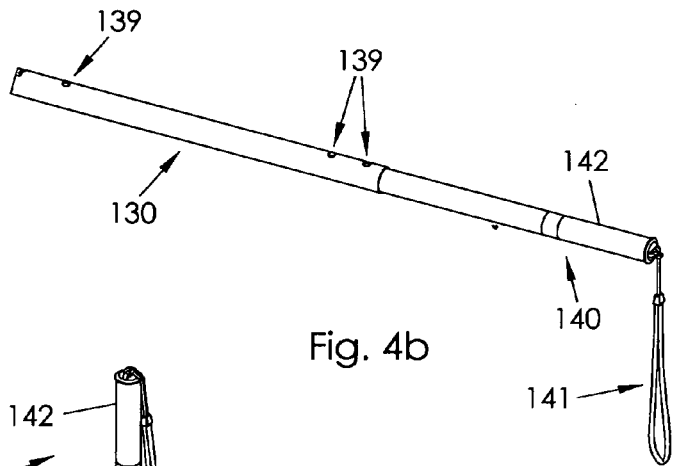
FIG. 4b is a fragmentary view of the second end of the fishing net handle as in FIG. 1a with the lantern in an extended configuration.
Figure 4C:
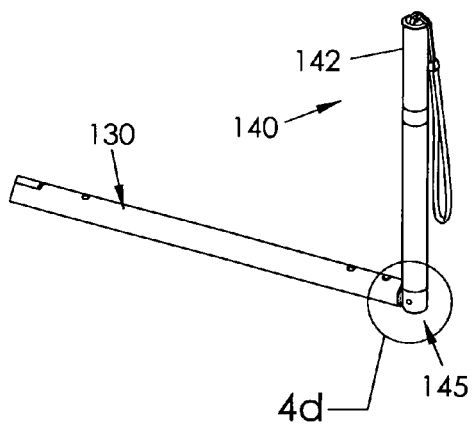
FIG. 4c is a perspective view of the handle as in FIG. 4b with the lantern positioned in an upstanding offset configuration relative to the handle.

The lantern 140 has a light element (e.g., a LED, a halogen light, a fluorescent light, an incandescent light, etc.) and may be selectively retractable in the second end 132b of the handle 130. A transparent window 142 may house the lantern light element, as shown in FIGS. 4b and 4c. A lantern bracket 145 (FIG. 2) is movable inside the handle 130 between an extended configuration 145a adjacent the handle second end 132b (FIG. 1a) and a retracted configuration 145b spaced apart from the handle second end 132b (FIG. 1b). As shown in FIG. 1b, the lantern 140 may be retracted into the handle second end 132b when the lantern bracket 145 is at the retracted configuration 145b. To maintain the lantern bracket 145 at the extended and retracted configurations 145a, 145b, the lantern bracket 145 may include a spring-loaded pin 148, and the handle 130 may include a plurality of apertures 139 complementary to the pin 148. The pin 148 may be received in respective apertures 139 to maintain the lantern bracket 145 at the extended and retracted configurations 145a, 145b.

Figure 4D:
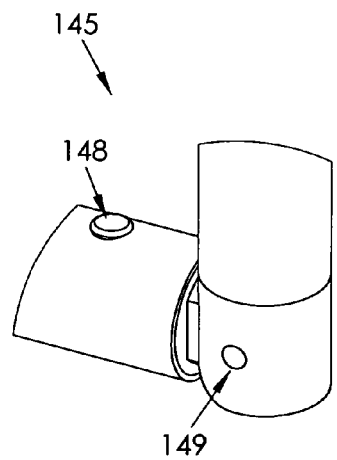
FIG. 4d is an isolated view on an enlarged scale of a portion the device shown in FIG. 4c.

As shown in FIGS. 2 and 4d, the lantern bracket 145 may include a hinge 149 to allow the lantern 140 to be angularly offset from the handle 130 when the lantern bracket 145 is at the extended configuration 145b. In other words, the hinge 149 may allow the lantern 140 to be bent or angled relative to the handle 130. Aperture 139a (FIG. 2) may allow the lantern bracket 145 to be maintained near the extended configuration 145a but may restrict the movement of the hinge 149 to maintain the lantern 140 in line with the handle 130. The lantern 140 may be permanently or removably coupled to the lantern bracket 145, and a lanyard 141 may be coupled to the lantern 140 so that the lanyard 141 is accessible when the lantern 140 is retracted into the handle second end (FIG. 1b).

An array of light elements 150 (e.g., LEDs, halogen lights, fluorescent lights, incandescent lights, etc.) may be coupled to the hoop 110, as shown in FIG. 2, to light the catch area 122.

Figure 3:
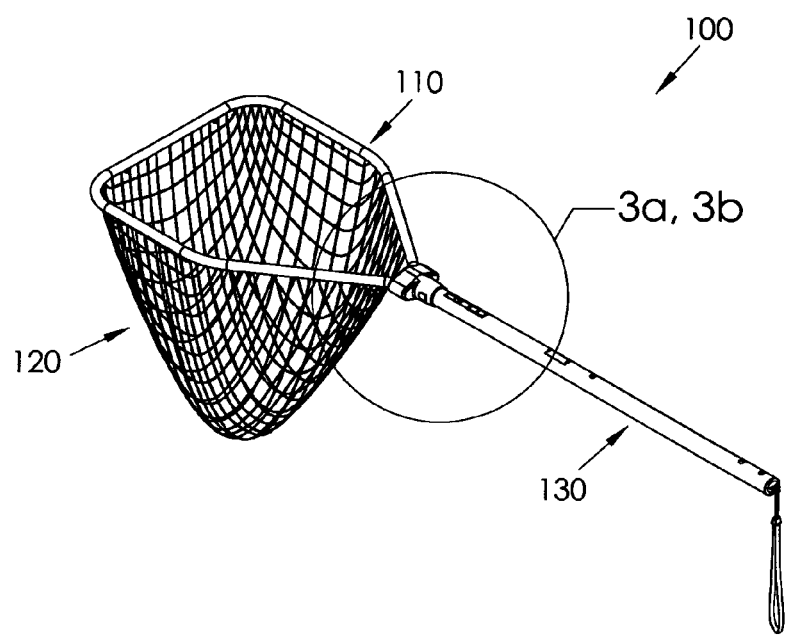
FIG. 3 is another perspective view of the fishing net as in FIG. 1b.
Figure 3A:
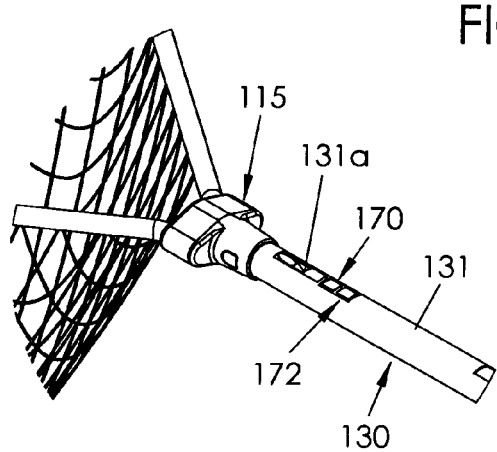
FIG. 3a is an isolated view on an enlarged scale of a portion of the fishing net as in FIG. 3 with a flexible shaft in a retracted configuration.
Figure 3B:
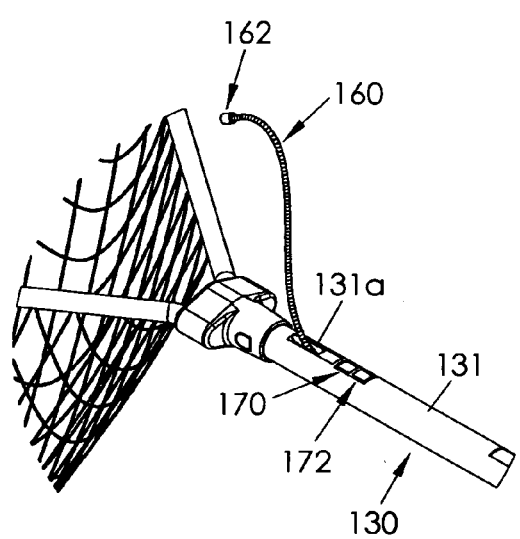
FIG. 3b is another isolated view on an enlarged basis as in FIG. 3a with the flexible shaft in an extended configuration.

A flexible shaft 160 may be selectively retractable in the handle 130, and a light element 162 (e.g., a LED, a halogen light, a fluorescent light, an incandescent light, etc.) may be coupled to the flexible shaft 160 to light an area adjacent the flexible shaft 160. More particularly, as shown in FIGS. 3a and 3b, the handle 130 may have a side 131 defining an opening 131a, and the flexible shaft 160 may be selectively extendable (FIG. 3b) and retractable (FIG. 3a) through the opening 131a. The handle 130 may be movable between the use and storage configurations 130a, 130b (as discussed above) when the flexible shaft 160 is retracted through the opening 131a, but the flexible shaft 160 may block the handle 130 from moving between the use and storage configurations 130a, 130b when the flexible shaft 160 is extended through the opening 131a.

Figure 5:
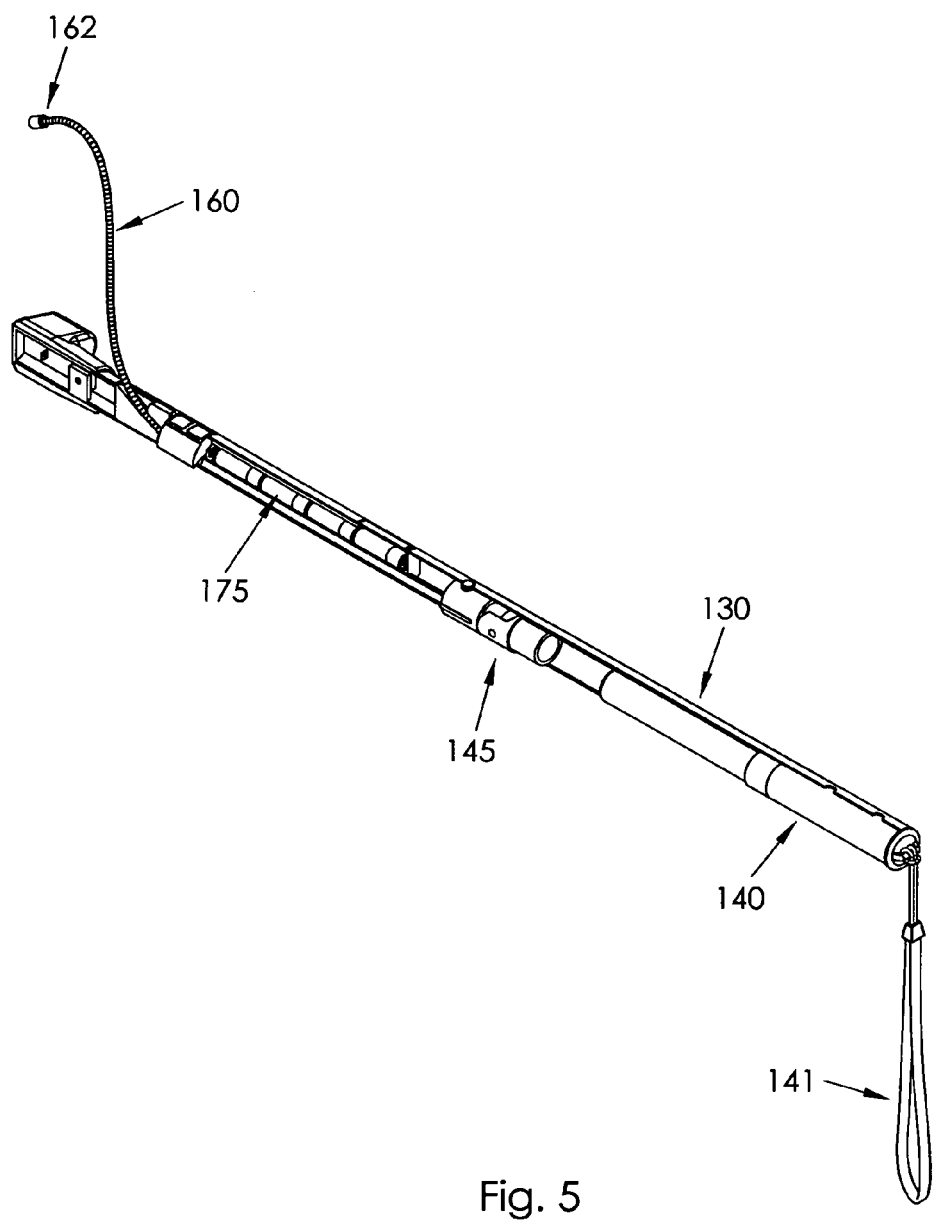
FIG. 5 is a perspective view of the fishing net shown in FIG. 1a with the hoop and a portion of the handle wall removed for clarity.

Means for actuating the array of light elements 150 and means for actuating the light element 162 coupled to the flexible shaft 160 may be included. For example, switches 170, 172 (FIGS. 3a and 3b) in electrical communication with the array of light elements 150 and the light element 162 may be included. The array of light elements 150 and the light element 162 may be powered from a common power source 175 (e.g., a common battery), as shown in FIG. 5, or separate power sources may be used. If the lantern 140 is removably attached to the lantern bracket 145, the lantern 140 may have its own power source. A switch for actuating the lantern light element may also be included.

In use, the handle 130 may be at the use configuration 130a (as discussed above), and a fisherman or other user may hold the handle 130 and capture an item (e.g., a fish, etc.) in the catch area 122 of the net 120. The user may place his wrist through the lanyard 141 to maintain a firm grip on the fishing net 100, and once the item is captured in the catch area 122, the measurement indicia 137 may be used to determine the length of the item caught.

In low light situations, the array of light elements 150 may be actuated using the switch 170 to light the catch area 122. The flexible shaft 160 may be extended as discussed above (FIG. 3b), and the light element 162 may be actuated using the switch 172 to provide additional light. As shown in FIG. 1a, the lantern bracket 145 may be moved to the extended configuration 145a, and the lantern light element may be actuated to provide further light. If the lantern bracket 145 includes the hinge 149 as discussed above, the lantern 140 may be angled relative to the handle 130 to better direct the light from the lantern light element, as shown in FIG. 4c. If the lantern 140 is removably coupled to the lantern bracket 145, the lantern 140 may be separated from the lantern bracket 145 (and therefore the handle 130) and used to provide light (i.e., using the lantern light element). To store the fishing net 100, the lantern bracket 145 may be moved to the retracted configuration 145b, and the handle 130 may be moved to the storage configuration 130b as discussed above.

It is understood that while certain forms of this invention have been illustrated and described, it is not limited thereto except insofar as such limitations are included in the following claims and allowable functional equivalents thereof.

The invention claimed is:

1. A fishing net, comprising:
a hoop having first and second ends;
a bracket coupled to said hoop first end and said hoop second end, said bracket defining a passage between said hoop first and second ends;
a net coupled to said hoop to define a catch area;
a handle having first and second ends, said handle being movable through said bracket passage between use and storage configurations, said handle first end being adjacent said bracket and said handle second end being relatively distant from said hoop when said handle is at said use configuration, said handle first end being separated from said bracket and said handle second end being relatively near said hoop when said handle is at said storage configuration;

means for selectively maintaining said handle at said use configuration;

an array of light elements coupled to said hoop to light said catch area;

a flexible shaft selectively retractable in said handle;

a light element coupled to said flexible shaft to light an area adjacent said flexible shaft; and a lantern selectively retractable into said handle second end, said lantern having a light element.

2. The fishing net of claim 1, wherein:

a lantern bracket is movable inside said handle between an extended configuration adjacent said handle second end and a retracted configuration spaced apart from said handle second end, said lantern being retracted into said handle second end when said lantern bracket is at said retracted configuration; and said lantern is removably coupled to said lantern bracket.

3. The fishing net of claim 2, wherein said lantern bracket includes a hinge to allow said lantern to be angularly offset from said handle when said lantern bracket is at said extended configuration.

4. The fishing net of claim 3, further comprising a lanyard coupled to said lantern, said lanyard being accessible when said lantern is retracted into said handle second end.

5. The fishing net of claim 4, wherein said handle includes measurement indicia for determining a length of an item caught using said net.

6. The fishing net of claim 1, further comprising:

means for actuating said away of light elements;

means for actuating said light element coupled to said flexible shaft; and means for actuating said lantern light element.

7. The fishing net of claim 1, wherein:

said handle has a side defining an opening;

said flexible shaft is selectively extendable and retractable through said opening;

said handle is movable between said use and storage configurations when said flexible shaft is retracted through said opening;

said flexible shaft blocks said handle from moving between said use and storage configurations when said flexible shaft is extended through said opening;

said handle first end has a configuration for maintaining said handle coupled to said bracket.

8. A fishing net, comprising:

a hoop having first and second ends;

a bracket coupled to said hoop first end and said hoop second end, said bracket defining a passage between said hoop first and second ends;

a net coupled to said hoop to define a catch area;

a handle having first and second ends, said handle being movable through said bracket passage between use and storage configurations, said handle first end being adjacent said bracket and said handle second end being relatively distant from said hoop when said handle is at said use configuration, said handle first end being separated from said bracket and said handle second end being relatively near said hoop when said handle is at said storage configuration;

means for selectively maintaining said handle at said use configuration; and a lantern selectively retractable into said handle second end, said lantern having a light element.

9. The fishing net of claim 8, wherein:

a lantern bracket is movable inside said handle between an extended configuration adjacent said handle second end and a retracted configuration spaced apart from said handle second end, said lantern being retracted into said handle second end when said lantern bracket is at said retracted configuration; and said lantern is removably coupled to said lantern bracket.

10. The fishing net of claim 9, wherein said lantern bracket includes a hinge to allow said lantern to be angularly offset from said handle when said lantern bracket is at said extended configuration.

11. The fishing net of claim 8, wherein:

a lantern bracket is movable inside said handle between an extended configuration adjacent said handle second end and a retracted configuration spaced apart from said handle second end, said lantern being retracted into said handle second end when said lantern bracket is at said retracted configuration; and said lantern bracket includes a hinge to allow said lantern to be angularly offset from said handle when said lantern bracket is at said extended configuration.

12. The fishing net of claim 8, further comprising a lanyard coupled to said lantern, said lanyard being accessible when said lantern is retracted into said handle second end.

13. The fishing net of claim 8, further comprising an array of light elements coupled to said hoop to light said catch area.

14. The fishing net of claim 8, further comprising:

a flexible shaft selectively retractable in said handle; and a light element coupled to said flexible shaft to light an area adjacent said flexible shaft.

* * * * *